No. 730,474. PATENTED JUNE 9, 1903.
E. B. RAYNER.
PNEUMATIC TIRE.
APPLICATION FILED OCT. 30, 1902.
NO MODEL.

Witnesses

Inventor
Edwin B. Rayner
by
Lacey, Attorneys.

No. 730,474.

Patented June 9, 1903.

UNITED STATES PATENT OFFICE.

EDWIN B. RAYNER, OF PIQUA, OHIO.

PNEUMATIC TIRE.

SPECIFICATION forming part of Letters Patent No. 730,474, dated June 9, 1903.

Application filed October 30, 1902. Serial No. 129,456. (No model.)

*To all whom it may concern:*

Be it known that I, EDWIN B. RAYNER, a citizen of the United States, residing at Piqua, in the county of Miami and State of Ohio, have invented certain new and useful Improvements in Pneumatic Tires, of which the following is a specification.

As generally constructed pneumatic tires when deflated and pressed into service are more or less injured, depending upon the service of the road over which the tire is impelled, the weight to be carried, and the length of time the tire is used in the deflated condition.

This invention provides a tire combining the advantages of both pneumatic and cushion tires. When inflated, the tire is resilient and as easy-running as any pneumatic tire, and when receiving a puncture or other injury causing deflation the tire acts as a cushion-tire and may be depended upon to carry the load home without inconvenience or annoyance to the rider or injury to the tire, the tread portion of which is pressed into or opposite a channel, so as not to come in injurious contact with the surface or road over which the tire is traveling.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
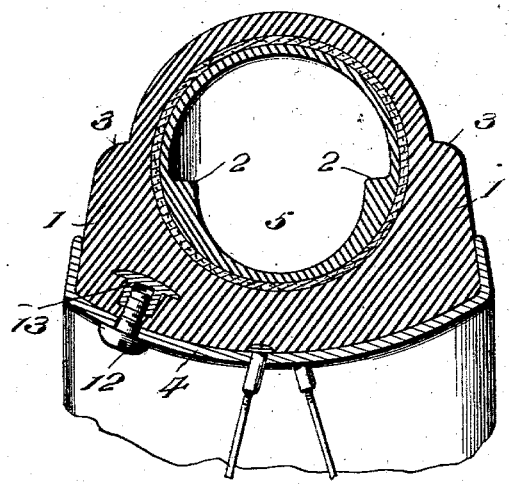
Figure 2:
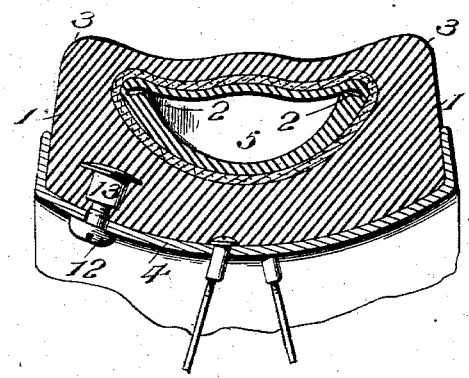
Figure 3:
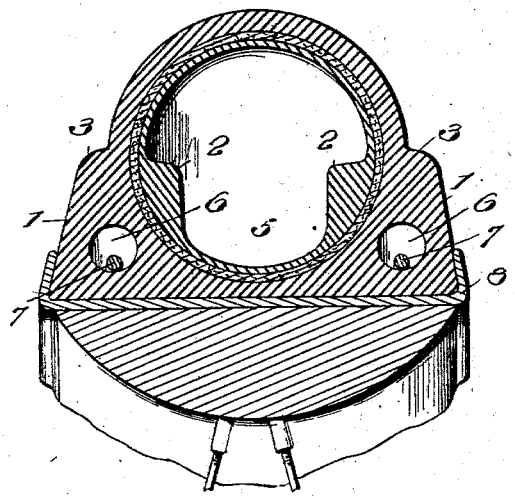
Figure 4:
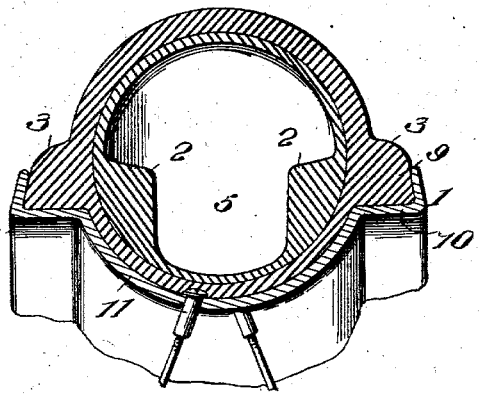

Figure 1 is a transverse section of a tire embodying the invention, the parts being shown in the position which they will occupy when the tire is in place. Fig. 2 is a view of the tire illustrated in Fig. 1, showing the position assumed by the parts when the tire is deflated. Figs. 3 and 4 are cross-sections of modifications.

Corresponding and like parts are referred to in the following description and indicated in all the views of the drawings by the same reference characters.

Within the purview of the invention the tire may have any cross-sectional outline and is tubular to admit of inflation and comprises, essentially, a tread portion and a rim portion. The rim portion of the tire is comparatively thick and stout to make provision for carrying the load when the tire is deflated from any cause, and the tread portion is comparatively thin to provide the necessary resiliency when the tire is inflated for use upon the pneumatic principle. The tire may involve any well-known construction and is preferably composite, being composed of textile and rubber, the textile being embedded in the rubber or arranged between inner and outer tubes or casings of rubber. The rim portion of the tire has its side portions thickened, as shown at 1, to provide the necessary amount of material for sustaining the load when the tire is used on the cushion principle. The thickened side portions 1 project beyond the inner and outer sides of the tread portion of the tire to form inner shoulders 2 and outer shoulders 3, which sustain the load when the tire is deflated, as indicated most clearly in Fig. 2. The inner shoulders 2 are nearer the rim 4 than the outer shoulders 3, the distance between the two sets of shoulders 2 and 3 being such as to allow for the tread portion of the tire being pressed inward for safety and enable the load to be carried upon the thickened side portions of the tire, as indicated in Fig. 2.

The rim portion of the tire is depressed or channeled between the shoulders 2, as indicated at 5, and the tread portion of the tire comes opposite to said channel or is pressed therein slightly, so as to be out of the way and not carry any of the load.

In the construction shown in Figs. 1 and 2 the inner side of the tire is convex to conform to the concavity of the rim 4, which is hollow upon its outer side in transverse section.

In the form shown in Fig. 3 the inner side of the tire is straight and the thickened side portions 1 are formed with openings 6, which receive binders 7 for securing the tire to the rim 8, said binders being wire or metal strips. The openings 6 also serve to increase the flexibility and resiliency of the tire.

In the construction shown in Fig. 4 the thickened side portions project outward and form, in effect, side ribs or flanges 9, which obtain a purchase upon outer flanges 10 of the rim 11, the latter having its middle portion depressed or channeled.

The tire may be secured to the rim of the wheel in any selected way, Fig. 4 showing it cemented to the rim, Fig. 3 illustrating positive attachment of the tire to the rim by means of the metal binders 7, and Figs. 1 and 2 showing screw-fasteners comprising a cap-screw 12 and a flanged nut 13, the former passing through an opening in the rim and the latter being embedded in the tire.

When the tire is inflated, it assumes the form shown in Figs. 1, 3, and 4, and when deflated from any cause it assumes the form substantially as shown in Fig. 2, the load being sustained by the thickened side portions and the tread portion being pressed inward, so as not to come into injurious contact with the surface over which the tire is propelled.

Having thus described the invention, what is claimed as new is—

1. A pneumatic tire having its side portions thickened to form inner and outer shoulders which carry the load when the tire is deflated, substantially as set forth.

2. A pneumatic tire having its side portions thickened to form inner and outer shoulders, the inner shoulders being nearer the rim than the outer shoulders to enable the tread portion of the tire being pressed inward so as not to come into injurious contact with the surface or road, substantially as set forth.

3. A pneumatic tire having its rim portion comparatively thick, its tread portion comparatively thin and its side portions thickened to form inner and outer shoulders for carrying the load when the tire is deflated, the inner shoulders being nearer the rim than the outer shoulders, substantially as set forth.

4. A pneumatic tire having its side portions thickened to provide inner and outer shoulders and having side ribs or flanges to obtain a purchase upon side seats of the rim, substantially as set forth.

In testimony whereof I affix my signature in presence of two witnesses.

EDWIN B. RAYNER. [L. S.]

Witnesses:
OTTO SIMON,
JOHN DETTMAN.